United States Patent
Choi et al.

(10) Patent No.: US 9,608,764 B2
(45) Date of Patent: Mar. 28, 2017

(54) UPLINK DATA ROUTING DURING MULTIPLE CARRIER POWER IMBALANCE

(71) Applicant: QUALCOMM Incorporated, San Diego, CA (US)

(72) Inventors: Zae Yong Choi, San Jose, CA (US); Omesh Kumar Handa, Carlsbad, CA (US); Rami Hmeidan Alnatsheh, San Diego, CA (US); Chaitanya Shah, San Diego, CA (US); Yuan Wang, San Diego, CA (US); Luna Sapna D'Souza, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/795,678

(22) Filed: Jul. 9, 2015

(65) Prior Publication Data
US 2016/0173226 A1 Jun. 16, 2016

Related U.S. Application Data

(60) Provisional application No. 62/090,833, filed on Dec. 11, 2014.

(51) Int. Cl.
*H04W 52/44* (2009.01)
*H04W 52/34* (2009.01)
(Continued)

(52) U.S. Cl.
CPC ............ *H04K 3/45* (2013.01); *H04L 5/001* (2013.01); *H04W 52/146* (2013.01);
(Continued)

(58) Field of Classification Search
CPC ............ H04W 28/02; H04W 28/0205; H04W 28/0231; H04W 28/0236; H04W 28/0247; H04W 28/0252; H04W 28/0257; H04W 28/0268; H04W 28/0273; H04W 28/08; H04W 28/085; H04W 72/00; H04W 72/04; H04W 74/00; H04W 76/00; H04W 76/045; H04W 76/048; H04W 52/146; H04W 52/20; H04W 52/346; H04W 52/367; H04W 52/44; H04K 3/45; H04L 5/001

(Continued)

(56) References Cited

U.S. PATENT DOCUMENTS

2010/0029318 A1* 2/2010 Tano ..................... H04W 52/16 455/522
2013/0315157 A1* 11/2013 Krishnamurthy ..... H04L 5/0053 370/329

FOREIGN PATENT DOCUMENTS

EP  2490490 A1  8/2012

OTHER PUBLICATIONS

International Search Report and Written Opinion—PCT/US2015/062214—ISA/EPO—Feb. 24, 2016. 12 Total Pages.

* cited by examiner

Primary Examiner — Philip Sobutka
(74) Attorney, Agent, or Firm — Arent Fox LLP

(57) ABSTRACT

In an aspect, this disclosure provides for determining a power imbalance between a first radio frequency (RF) carrier and a second RF carrier of a dedicated physical control channel for uplink transmission, determining whether the power imbalance is greater than a power imbalance threshold, and blocking data transmission on one of the first RF carrier or the second RF carrier when the power imbalance is greater than the power imbalance threshold.

23 Claims, 6 Drawing Sheets

(51) Int. Cl.
    *H04K 3/00*           (2006.01)
    *H04L 5/00*           (2006.01)
    *H04W 52/14*         (2009.01)
    *H04W 52/20*         (2009.01)
    *H04W 52/36*         (2009.01)
    *H04W 28/08*         (2009.01)

(52) U.S. Cl.
    CPC ......... *H04W 52/20* (2013.01); *H04W 52/346* (2013.01); *H04W 52/367* (2013.01); *H04W 52/44* (2013.01); *H04W 28/085* (2013.01)

(58) Field of Classification Search
    USPC .......................... 455/1, 67.11, 453, 450, 451
    See application file for complete search history.

UPLINK DATA ROUTING DURING MULTIPLE CARRIER POWER IMBALANCE

CLAIM OF PRIORITY UNDER 35 U.S.C. §119

The present Application for Patent claims priority to Provisional Application No. 62/090,833 entitled "UPLINK DATA ROUTING DURING MULTIPLE CARRIER POWER IMBALANCE" filed Dec. 11, 2014, which is assigned to the assignee hereof and hereby expressly incorporated in its entirety by reference herein.

BACKGROUND

Aspects of the present disclosure relate generally to wireless communication systems, and more particularly, to uplink data routing.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Uplink Packet Access (HSUPA) is a protocol of HSPA that provides an enhanced dedicated uplink channel (E-DCH) that allows an option for selecting a transmission time interval (TTI) (e.g., 2 ms or 10 ms), and a media access control (MAC) sublayer to process scheduling of uplink transmissions and hybrid automatic repeat request (HARQ) signals.

As the demand for mobile broadband access continues to increase, research and development continue to advance the UMTS technologies not only to meet the growing demand for mobile broadband access, but to advance and enhance the user experience with mobile communications.

In current HSPA systems, a user equipment (UE) may transmit uplink physical channels over multiple carriers that may include a dedicated physical control channel (DPCCH). If there is a power imbalance among the multiple carriers, call drops and severe throughput degradation may result. For example, depending on the channel condition, there could be a large power difference on the DPCCH of each carrier in HSUPA since the inner loop power control of the carriers is allowed to be independently controlled by an eNode B. This power level difference is called DPCCH power imbalance. In the case of the call drop with the DPCCH power imbalance, data throughput is degraded first, and call drop happens if the critical data did not go through even after high layer retransmission. The uplink degradation may be caused by sudden and deep channel fading, too much interference from other UEs, E-DCH power compression due to excessive transmit power at the UE, and low signal-to-noise ratio. As such, improvements in transmitting uplink physical channels over multiple carriers are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The disclosure provides for controlling data routing over multiple carriers under conditions of a power imbalance, and optionally in combination with a block error rate condition, in wireless communications. In an aspect, this disclosure provides a method of a user equipment controlling dual carrier uplink transmission for wireless communications, comprising determining a power imbalance between a first radio frequency (RF) carrier and a second RF carrier of a dedicated physical control channel for uplink transmission, determining whether the power imbalance is greater than a power imbalance threshold, and blocking data transmission on one of the first RF carrier or the second RF carrier when the power imbalance is greater than the power imbalance threshold.

In another aspect, this disclosure provides a method of a user equipment controlling dual carrier uplink transmission for wireless communications, comprising blocking data transmission on one of a first RF carrier or a second RF carrier in response to a determined power imbalance between the first radio frequency (RF) carrier and the second RF carrier of a dedicated physical control channel for uplink transmission, setting an unblocking value to a minimum power imbalance threshold on a condition that the power imbalance is greater than a maximum power imbalance threshold, setting the unblocking value to the determined power imbalance on a condition that the power imbalance is not greater than a maximum power imbalance threshold but is greater than a minimum power imbalance threshold and that a detected uplink block error rate (BLER) is greater than a BLER threshold, and unblocking a blocked data transmission on the one of the first RF carrier or the second RF carrier on a first condition that the power imbalance is less than the minimum power imbalance threshold, or on a second condition that the power imbalance is less than the unblocking value minus a fixed margin value.

In another aspect, this disclosure provides for a user equipment (UE) for controlling dual carrier uplink transmission for wireless communication, comprising a transceiver including a transmitter configuration of current transmit power settings for each of a plurality of RF carriers, and a modem processor, coupled to the transceiver, including a power imbalance component configured to determine a power imbalance between a first radio frequency (RF) carrier and a second RF carrier of a dedicated physical control channel for uplink transmission based on the transmitter configuration and to determine whether the power imbalance is greater than a power imbalance threshold, and a carrier blocking component configured to block data transmission on one of the first RF carrier or the second RF carrier when the power imbalance is greater than the power imbalance threshold.

In another aspect, this disclosure provides for a UE for controlling dual carrier uplink transmission for wireless communication, comprising a transceiver including a transmitter configuration of current transmit power settings for each of a plurality of RF carriers, and a modem processor, coupled to the transceiver, including a carrier blocking component configured to block data transmission on one of a first RF carrier or a second RF carrier in response to a determined power imbalance between the first radio frequency (RF) carrier and the second RF carrier of a dedicated physical control channel for uplink transmission based on the transmitter configuration, set an unblocking value to a minimum power imbalance threshold on a condition that the power imbalance is greater than a maximum power imbalance threshold, set the unblocking value to the determined power imbalance on a condition that the power imbalance is not greater than a maximum power imbalance threshold but is greater than a minimum power imbalance threshold and that a detected uplink block error rate (BLER) is greater than a BLER threshold, and unblock data transmission on the one of the first RF carrier or the second RF carrier on a first condition that the power imbalance is less than the minimum power imbalance threshold, or on a second condition that the power imbalance is less than the unblocking value minus a fixed margin value.

In another aspect, this disclosure provides for a UE for controlling dual carrier uplink transmission for wireless communication, comprising means for determining a power imbalance between a first radio frequency (RF) carrier and a second RF carrier of a dedicated physical control channel for uplink transmission, means for determining whether the power imbalance is greater than a power imbalance threshold, and means for blocking data transmission on one of the first RF carrier or the second RF carrier when the power imbalance is greater than the power imbalance threshold.

These and other aspects of the disclosure will become more fully understood upon a review of the detailed description, which follows.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures may be shown in block diagram form in order to avoid obscuring such concepts. In an aspect, the term "function" as used herein may be one of the parts that make up a system, may be hardware, firmware, and/or software, and may be divided into other functions.

The present disclosure provides for user equipment (UE)-controlled management of uplink data routing to multiple RF uplink carriers in the presence of a transmit power imbalance between at least two of the RF uplink carriers. In the case of dual carrier transmission, for example, the chance of having one good carrier (e.g., a carrier having a radio link of a sufficient quality to establish/maintain a call) is quite high even when the other carrier is in bad condition (e.g., a carrier having a radio link of borderline or insufficient quality to establish/maintain a call). According to the present aspects, the UE may detect a condition which will lead to a failure of data transmission on one carrier and select a data routing to a better carrier for subsequent transmissions. Parameters used to detect the condition include a power imbalance between dedicated physical control channel (DPCCH) to two or more carriers, and Node B feedback of block error rate (BLER) measurements of the uplink physical layer transmissions. These parameters may be used with an AND condition to make the detection more secure. For instance, in one example, the UE may start the data routing to a specific carrier (or block data routing to one carrier) when a first amount of power imbalance is greater than a threshold. Further, in another example, the UE may start the data routing to a specific carrier (or block data routing to one carrier) when the UE detects a certain level of HSUPA BLER and a second amount of power imbalance (e.g., different from the first amount of power imbalance). The UE can release the data routing to the specific carrier (or release the blocking of one carrier) when the UE detects an improved power imbalance.

Figure 1:
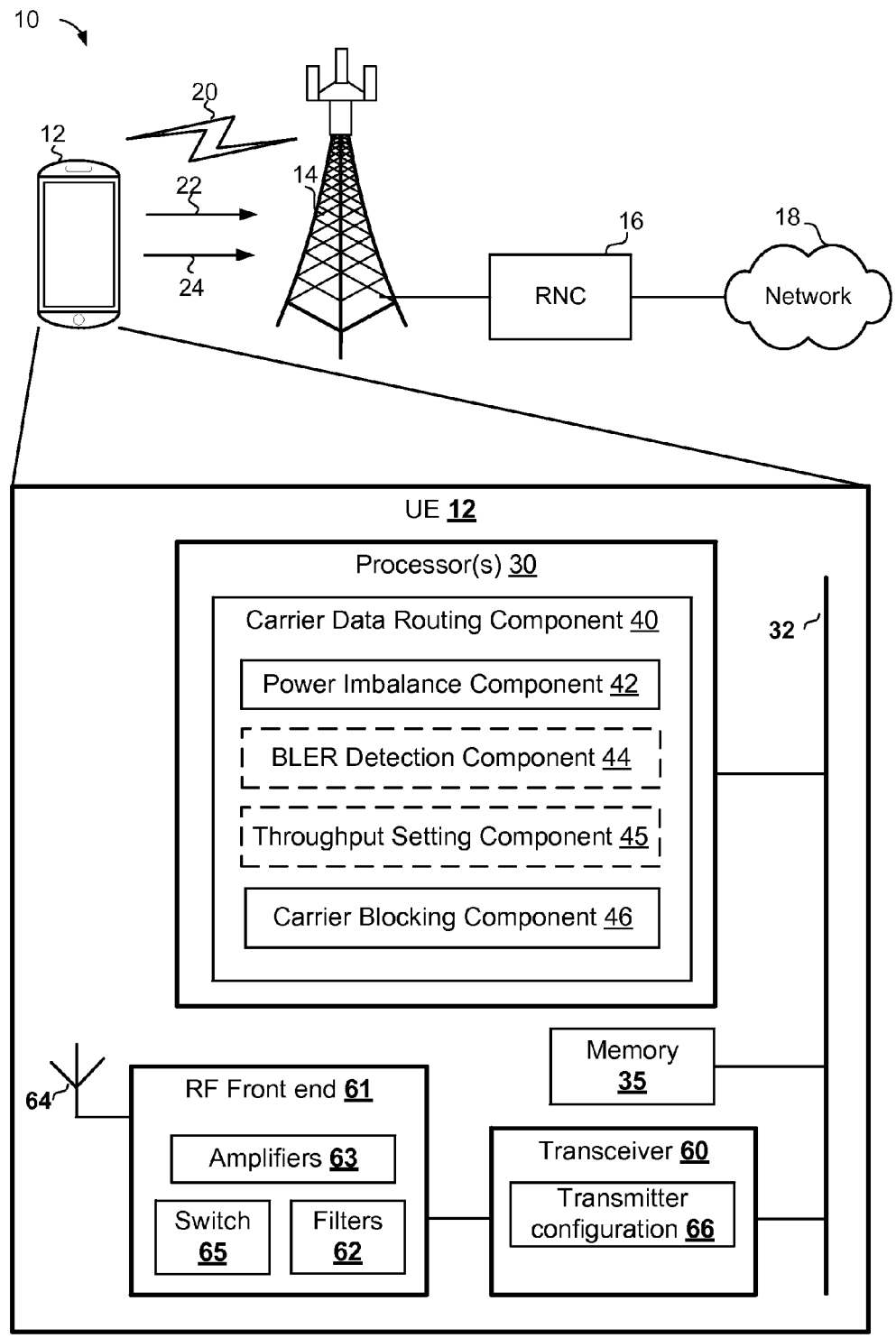
FIG. 1 is a block diagram illustrating an example communications network including a network entity, such as a base station, in communication with a user equipment (UE) configured for UE-controlled management of uplink data routing to multiple RF uplink carriers in the presence of a transmit power imbalance between at least two of the RF uplink carriers.

Referring to FIG. 1, in an aspect, a wireless communication system 10 includes at least one UE 12 in communication coverage of at least one network entity 14 (e.g., base station or Node B). In an aspect, the network entity 14 may be a base station such a Node B in an UMTS network. UE 12 may communicate with a network 18 via network entity 14 and a radio network controller (RNC) 16. In some aspects, multiple UEs including UE 12 may be in communication coverage with one or more network entities, including network entity 14. In an example, UE 12 may transmit and/or receive wireless communications 20 to and/or from network entity 14.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc), an appliance, a sensor, a vehicle communication system, a medical device, a vending machine, a device for the Internet-of-Things, or any other similar functioning device. Additionally, network entity 14 may be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access at UE 12.

According to the present aspects, UE 12 may include one or more processors 30 coupled to a memory 35 and transceiver 60 via a bus 32. One or more processors 30 may execute various functions related to uplink carrier data routing as described herein. For instance, in some aspects, the various functions related to uplink carrier data routing as described herein may be executed by a single processor, while in other aspects different ones of the functions may be executed by a combination of two or more different processors. For example, in an aspect, one or more processors 30 may include any one or any combination of a modem processor, or a baseband processor, or a digital signal processor, or a transmit processor, or a transceiver processor. In particular, one or more processors 30 may execute a carrier data routing component 40 to block and unblock data transmissions on one of at least two uplink RF carriers 22, 24 based on the presence of a certain amount of transmit power imbalance between the at least two uplink RF carriers 22, 24. In an optional aspect, in addition to being based on the presence of the transmit power imbalance between the at least two uplink RF carriers 22, 24, carrier data routing component 40 may be configured to block and unblock data transmissions on one of at least two uplink RF carriers 22, 24 further based on the presence of a certain amount of BLER on one of at least two uplink RF carriers 22, 24. In a further optional aspect, in the presence of a certain amount of transmit power imbalance, and, optionally, a certain amount of BLER, carrier data routing component 40 also may be configured to reduce an allowed throughput in one or more remaining, unblocked ones of at least two uplink RF carriers 22, 24. In an aspect, carrier data routing component 40 may include hardware and/or software code executable by a processor for controlling carrier data routing of an uplink control channel in the presence of a transmit power imbalance between at least two uplink RF carriers. In an aspect, the term "function" as used herein may be one of the parts that make up a system, may be hardware, firmware, and/or software, and may be divided into other functions.

In an aspect, for example, carrier data routing component 40 may be implemented to include, be in communication with, or control, one or more subfunctions. For instance, carrier data routing component 40 may include or control a power imbalance component 42 for detecting the power imbalance, a BLER detection component 44 for detecting BLER, a throughput setting component 45 for controlling an amount of throughput per carrier, and a carrier blocking component 46 for controlling transmissions over each of the at least two uplink RF carriers 22, 24. Although illustrated as being a part of carrier data routing component 40, it should be understood that the subfunctions discussed herein may be implemented independent on the same or on a different processor.

Power imbalance component 42 may include hardware and/or software code executable by a processor for determining a power imbalance between the at least two uplink RF carriers 22, 24, e.g., between a first RF carrier and a second RF carrier in uplink transmissions. For example, the power imbalance component 42 may monitor a control channel such as a respective dedicated physical control channel (DPCCH) being transmitted over at least two uplink RF carriers 22, 24 by UE 12.

BLER detection component 44 may include hardware and/or software code executable by a processor for determining one or more BLER conditions associated with transmissions over at least two uplink RF carriers 22, 24. There may be several BLER patterns over time due to a poor channel condition. In an aspect, for instance, BLER detection component 44 may determine a severe BLER condition based on exceeding a maximum number of consecutive block errors, or a residual BLER condition based on a exceeding a maximum number of retransmission failures for UE 12. For example, but not limited hereto, a severe BLER condition may be observed if k consecutive block errors are detected. As another example, but not limited hereto, a residual BLER condition may be observed upon detection of N failed retransmissions for a particular HARQ ID, such as HARQ retransmissions on an enhanced uplink channel, where N is defined as the maximum number of allowable retransmissions. According to these example BLER conditions set forth above, a severe BLER condition may eventually lead to a residual BLER condition. In the aspects presented herein, corrective measures may be implemented upon detection of either the severe BLER condition or the residual BLER condition, as will be described below.

Throughput setting component 45 may include hardware and/or software code executable by a processor for determining a reduced limit of the maximum throughput, as defined by ETFCI codes, associated with transmissions over the at least two uplink RF carriers 22, 24. For example, there may by 128 ETFCI index codes that map to data throughput rates. If an RF carrier for an uplink channel is observed having excessive BLER, then the throughput setting component 45 may set a limit for maximum throughput by defining an ETFCI that corresponds to a throughput having a reduced level of throughput (e.g., a value within a range that includes, but is not limited to, 30-80% of maximum throughput).

Carrier blocking component 46 may include hardware and/or software code executable by a processor for determining which RF carrier among at least two uplink RF carriers 22, 24 should be blocked based on the level of power imbalance, and in some optional aspects, additionally based on any observed severe or residual BLER. By blocking a failing RF carrier (e.g., in an aspect, the RF carrier having the highest transmit power) from uplink data transmission, a dropped call may be avoided by re-routing the data transmissions to a relatively better RF carrier. Carrier blocking component 46 may continue to monitor the power imbalance and, optionally, the BLER to determine when the blocked RF carrier may be unblocked and returned to service for UE 12 to send uplink transmissions.

Moreover, in an aspect, UE 12 may include a transceiver 60 for receiving and transmitting signals and communications, such as for receiving BLER reports or transmitting at least two uplink RF carriers 22, 24. For example, in an aspect, transceiver 60 may be in communication with, or connected to, an RF front end 61 defined by, for instance, one or more power amplifiers 63, one or more band specific filters 62, and one or more antennas 64. When a downlink signal is received by UE 12, such as a BLER report for example, antenna 64 converts radio waves to an electrical signal. Antenna switch 65 may be a duplex switch that may selectively operate to select either a transmit path or a receive path for the signal (e.g., to select a receive path in this example). Filters 62 perform frequency filtering on the signal to obtain the desired frequency band. Transceiver 60 may perform a downconversion of the received signal from RF front end 61, and may split the signal into in-phase and quadrature (I and Q) components. Amplifiers 63 may include a first amplifier to boost the filtered signal initially received from filters 62, and a second amplifier for boosting the I and Q components. The I and Q components may then be converted to a digital format and demodulated by transceiver 60. The I and Q components of received signal leaving transceiver 60 may be a baseband signal that may be then further processed by the at least one processor 30. Although transceiver 60 is shown as a separate component from one or more processors 30, it should be understood that in some implementations, transceiver 60 may be included as a part of one or more processors 30.

Transceiver 60 may include a radio frequency (RF) receiver, and may include hardware and/or software code executable by a processor configured to receive and decode radio transmissions, for example, wireless communications 20 transmitted by UE 12. For example, transceiver 60 may receive a BLER report transmitted by network entity 14. Additionally, for example, transceiver 60 may also include a transmitter and may include hardware and/or software code executable by a processor for transmitting the uplink data on at least two RF carriers 22, 24 (e.g., a first RF carrier and a second RF carrier of a dedicated physical control channel), where transceiver 60 may transmit each of at least two RF carriers 22, 24 at a respective transmit power level. In some cases, the respective transmit power level between at least two RF carriers 22, 24 may be different, leading to a transmit power imbalance. According to the presents aspects, after execution of carrier data routing component 40, transceiver 60 may transmit uplink data on an unblocked RF carrier, such as one of at least two RF carriers 22, 24. In an aspect, transceiver 60 may be an independent component of UE 12 separate from the carrier data routing component 40.

Figure 2A:
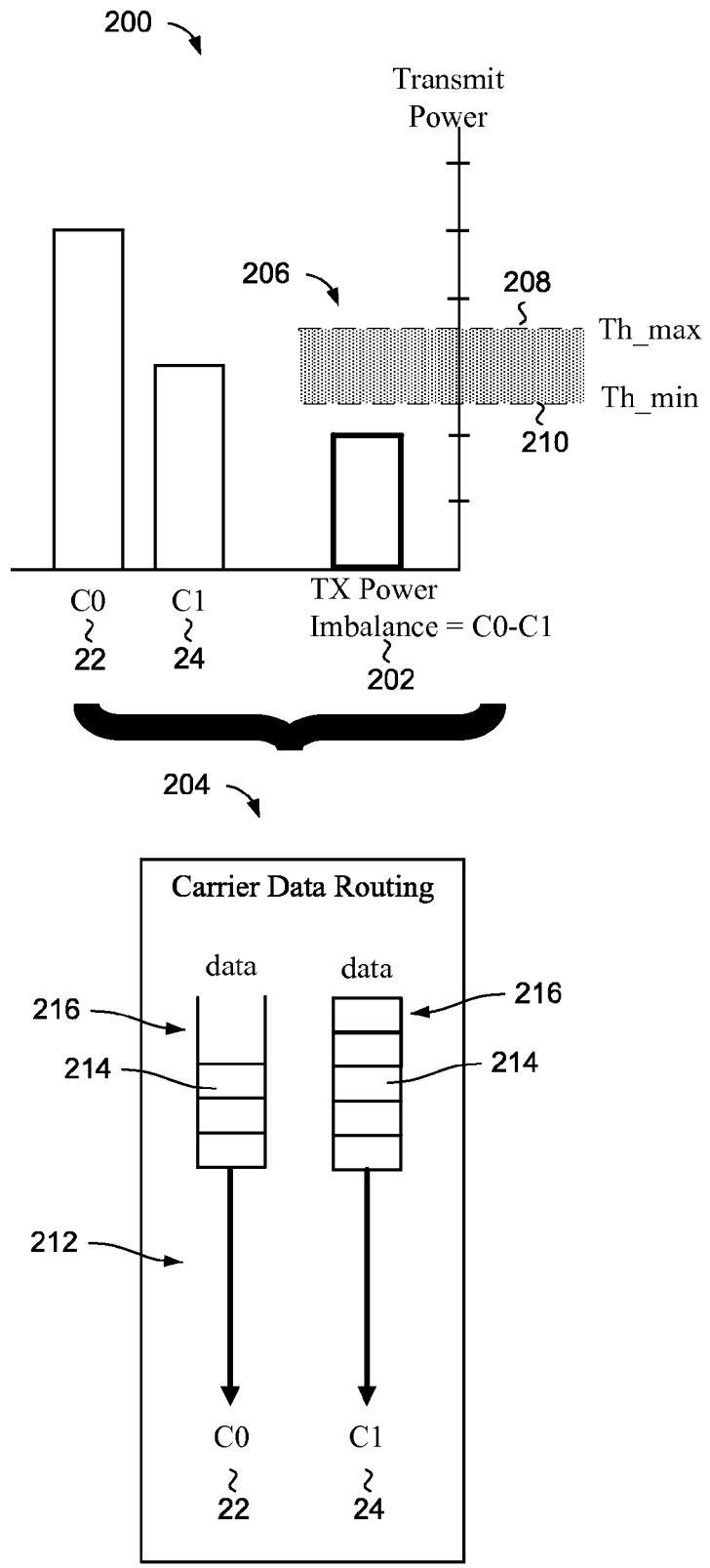
FIG. 2A is a graphical diagram illustrating an example of a threshold comparison implemented by the user equipment of FIG. 1 for management of the uplink data routing among the at least two RF carriers, and specifically to an example of normal data routing to each carrier based on a condition where a power imbalance between carriers is less than a certain (minimum) threshold.
Figure 2B:
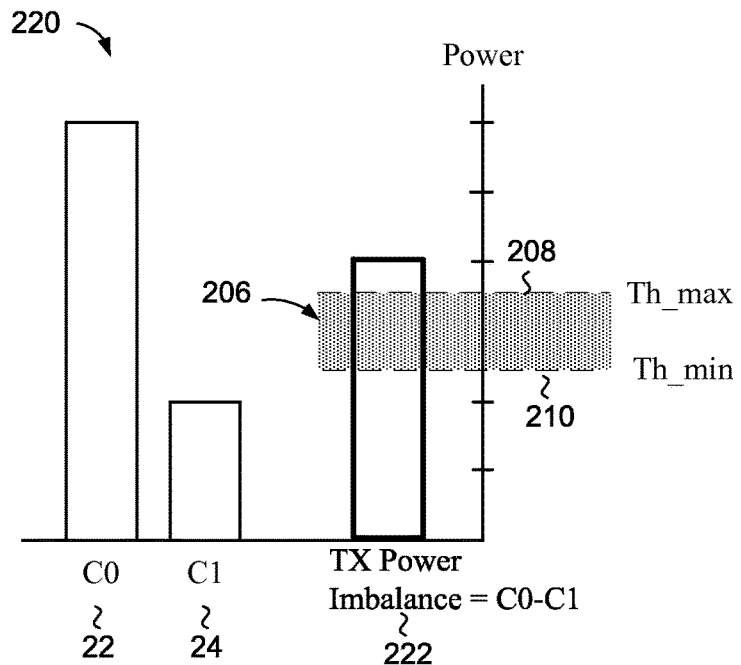
FIG. 2B is a graphical diagram illustrating an example of threshold comparisons implemented by the user equipment of FIG. 1 for management of the uplink data routing to the at least two RF carriers, and specifically to an example of adjusted data routing, and/or blocking a carrier, based on a condition where a power imbalance between carriers is greater than a certain (maximum) threshold.
Figure 2B:
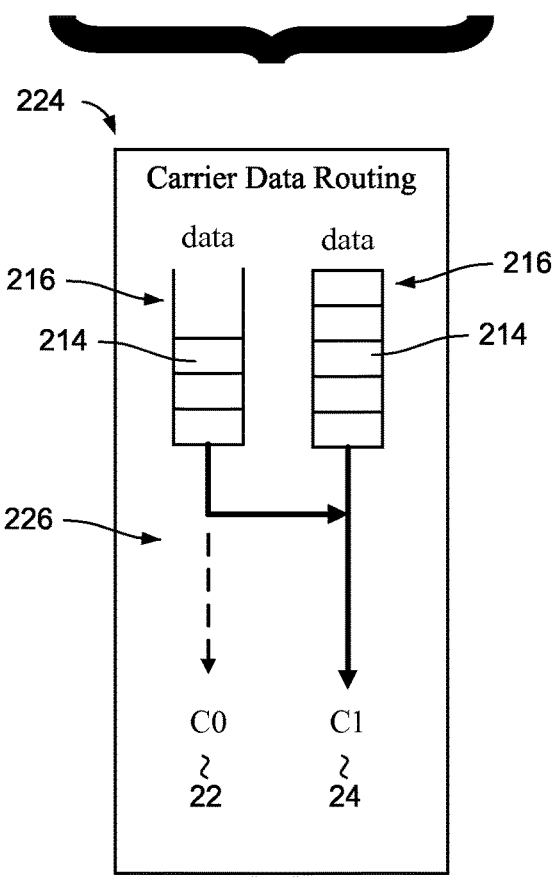
Figure 2C:
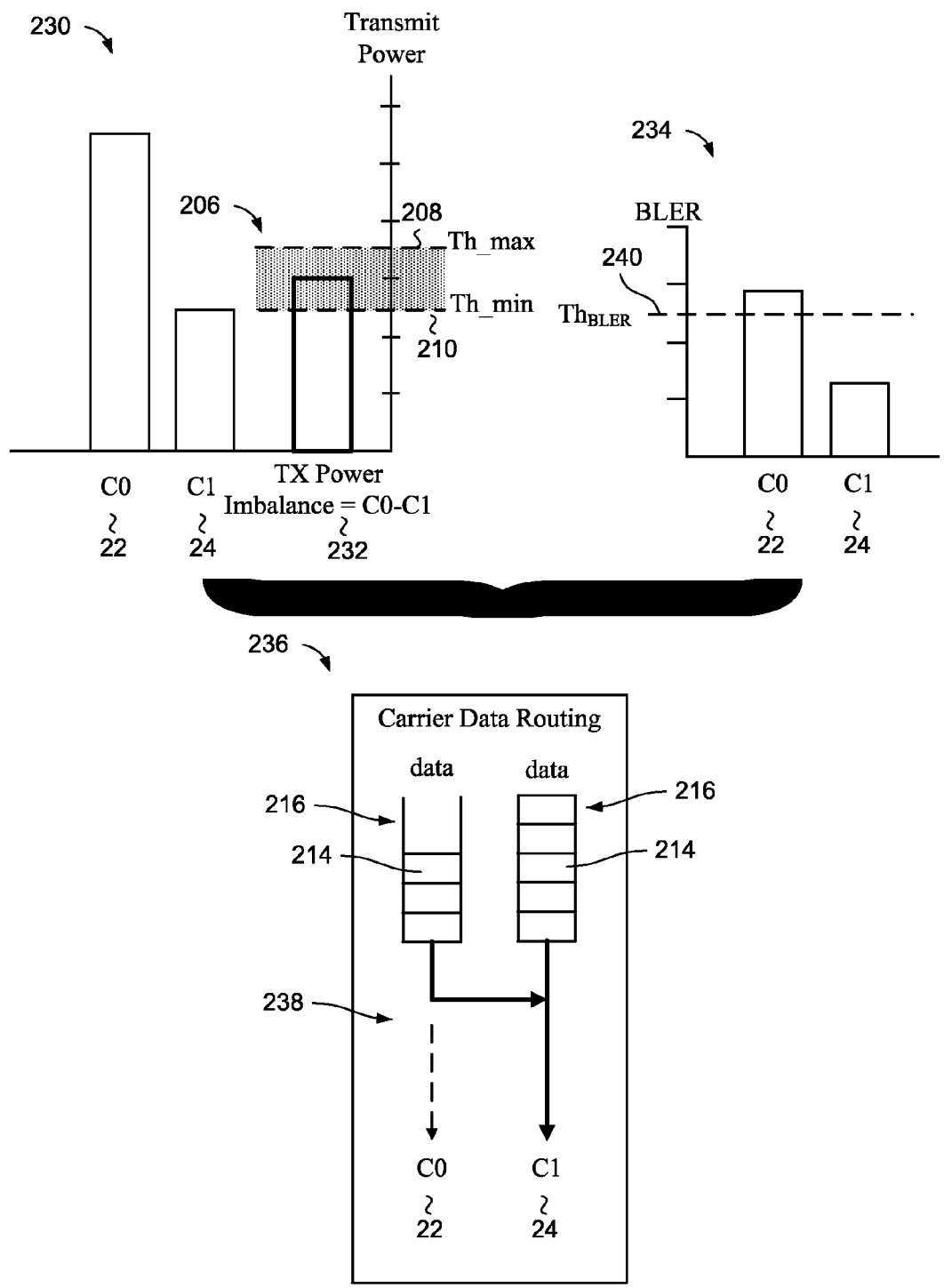
FIG. 2C is a graphical diagram illustrating an example of power imbalance and block error rate threshold comparisons implemented by the user equipment of FIG. 1 for management of the uplink data routing to the at least two RF carriers, and specifically to an example of adjusted data routing, and/or blocking a carrier, based on a condition where a power imbalance between carriers is between certain (minimum and maximum) thresholds, and where a block error rate (BLER) of a carrier is above a certain threshold.

Referring to FIGS. 2A-2C, in examples that should not be construed as limiting, the aspects of carrier data routing component 40 described herein may be executed by one or a combination of processors of UE 12 according to comparisons against a power threshold range and/or a BLER threshold. FIG. 2A relates to an example of normal data routing based on a condition where a power imbalance between carriers is less than a certain (minimum) threshold. FIG. 2B relates to an example of adjusted data routing, and/or blocking a carrier, based on a condition where a power imbalance between carriers is greater than a certain (maximum) threshold. FIG. 2C relates to an example of adjusted data routing, and/or blocking a carrier, based on a condition where a power imbalance between carriers is between certain (minimum and maximum) thresholds, and where a block error rate (BLER) of a carrier is above a certain threshold.

Turning first to FIG. 2A, a graph 200 represents transmit power per carrier for carrier C0 and carrier C1, such as uplink RF carriers 22, 24, and the transmit power imbalance 202 (e.g., transmit power delta) between the carriers, and a schematic diagram 204 represents a resulting carrier data routing 212 according to UE 12 operating carrier data routing component 40 as described herein. In this example, UE 12 transmits on a first RF carrier C0 and a second RF carrier C1 having a power imbalance 202 with a value (C0−C1), also referred to herein as a value delta, UE 12 may compare the value delta against a threshold range 206 between maximum threshold (Th_max) 208 and a minimum threshold (Th_min) 210. In this example, the power imbalance 202 has a value that does not exceed threshold Th_min 210, and as a result, referring to schematic diagram 204, UE 12 operating carrier data routing component 40 manages carrier data routing 212, e.g., the routing of data 214 in respective transmit data queues 216, by allowing normal (e.g., data 214 queued for transmission on a respective carrier is routed to the respective carrier) data routing to each of the RF carriers C0 and C1.

In FIG. 2B, a graph 220 represents transmit power per carrier for carrier C0 and carrier C1, such as uplink RF carriers 22, 24, and the transmit power imbalance 222 (e.g., transmit power delta) between the carriers, and a schematic diagram 224 represents a resulting carrier data routing 226 according to UE 12 operating carrier data routing component 40 as described herein. In this example, where UE 12 is transmitting on both RF carriers C0 and C1, and UE 12 subsequently detects a power imbalance 222 with value exceeding threshold Th_max 208. This comparison triggers UE 12 operating carrier data routing component 40 to manage carrier data routing 226 by blocking uplink transmission on RF carrier C0, which has the higher transmit power, and rerouting data 214 that was previously to be sent on RF carrier C0 to instead be sent on RF carrier C1, e.g., the carrier having the lower transmit power. The rationale for this re-routing is based on a principle that the severity of the power imbalance between the RF carriers C0 and C1 is an indication of poor channel conditions on RF carrier C0, and that generally a carrier with a relatively low transmit power has good channel conditions. As such, UE 12 may react by rerouting the data from RF carrier C0 to the RF carrier C1, which is deemed to be better capable of maintaining a data transmission at an acceptable level of transmit power (e.g., not approaching a maximum level).

Turning now to FIG. 2C, a graph 230 represents transmit power per carrier for carrier C0 and carrier C1, such as uplink RF carriers 22, 24, and the transmit power imbalance 232 (e.g., transmit power delta) between the carriers, a graph 234 represents a block error rate (BLER) per carrier for carrier C0 and carrier C1 relative to a BLER threshold, and a schematic diagram 236 represents a resulting carrier data routing 238 according to UE 12 operating carrier data routing component 40 as described herein. UE 12 in this example detects a value for the power imbalance 232 which falls within the threshold range 206 between thresholds Th_max 208 and Th_min 210. With power imbalance 232 being less severe than in the previous example of FIG. 2B, UE 12 operating carrier data routing component 40 may perform an additional comparison prior to blocking and rerouting data on RF carriers C0 or C1. Here, UE 12 operating carrier data routing component 40 further compares BLER of RF carriers C0 and C1 against a BLER threshold value ($Th_{BLER}$) 240, and if exceeded, UE 12 then proceeds to manage carrier data routing 238 as follows. Since BLER of RF carrier C0 exceeds the threshold value $Th_{BLER}$ 240, UE 12 blocks data routing to RF carrier C0, and reroutes the data 214 from RF carrier C0 to RF carrier C1, which has better channel conditions as indicated by both the power threshold and BLER threshold comparisons.

Figure 3A:
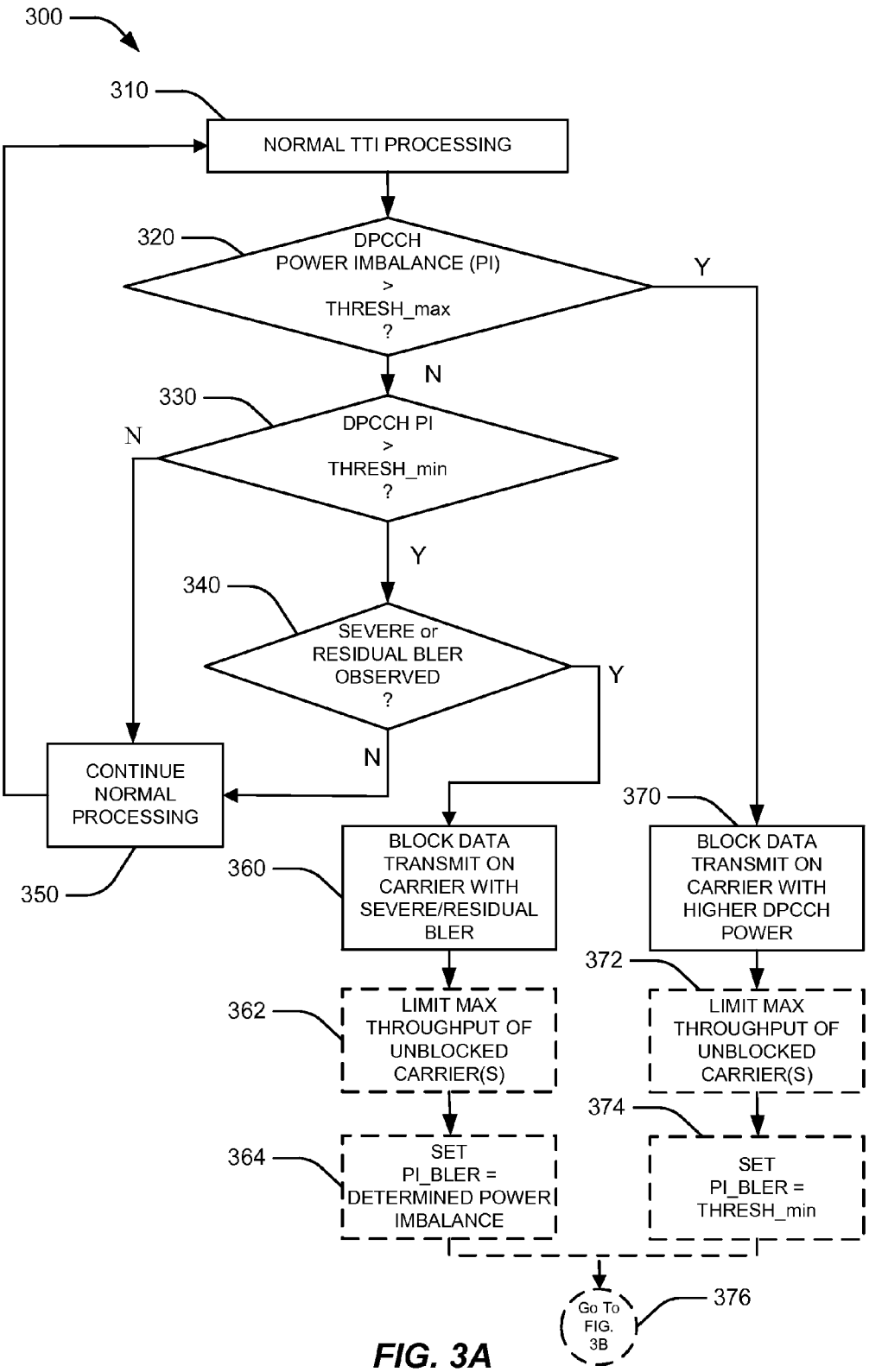
FIG. 3A is a flow diagram illustrating an example method of wireless communications for detecting a power imbalance between two RF carrier, or a power imbalanced combined with a block error rate, and maintaining normal data routing or blocking an uplink RF carrier.

Referring to FIG. 3A, in an operational aspect, a UE such as UE 12 (FIG. 1) may perform one aspect of a method 300 for control of uplink data transmissions on multiple carriers having a transmit power imbalance. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein. In an aspect, method 300 may be implemented by UE 12 and/or the one or more processors 30, such as a modem processor for example, executing carrier data routing component 40 and/or one or more of its sub-functions as described herein.

In an aspect, at block 310, the method 300 may include monitoring an uplink channel every transmission time interval (TTI) with respect to power imbalance on two or more RF carriers. For example, in an aspect, UE 12 and/or carrier data routing component 40 and/or power imbalance component 42 may monitor an uplink channel every transmission time interval (TTI) with respect to power imbalance on at least two RF carriers 22 and 24. In an alternative aspect, UE 12 and/or carrier data routing component 40 and/or power imbalance component 42 may monitor transmitter configuration 66 for transmit power settings at each of at least two RF carriers 22 and 24.

In a first aspect, method 300 involves a test that identifies whether a determined power imbalance between RF carriers in an uplink channel is greater than a maximum threshold value, and if so, performs one or more corrective actions to try to avoid a call drop and/or severe throughput degradation. In an aspect, for example, UE 12 and/or one or more processors 30 may execute carrier data routing component 40 and/or the power imbalance component 42 (FIG. 1) to detect a power imbalance between transmit power settings for at least two RF carriers 22 and 24 in transmitter configuration 66 by comparing power imbalance 202 to a threshold value that may be stored in memory 35.

In an aspect, at block 320, the method 300 may include determining if a power imbalance for an uplink channel is greater than a maximum threshold (THRESH_max) that may be stored in memory 35. For example, the value for THRESH_max may be set at a value within a range that includes, but is not limited to, about 15-30 dB, or more preferably to about 25 dB. In an aspect, for example, UE 12 and/or carrier data routing component 40 and/or power imbalance component 42 (FIG. 1) may determine a transmit power setting of each RF carrier for an uplink channel, such as the DPCCH, may compute an imbalance between at least a first RF carrier 22 and a second RF carrier 24, and may compare the imbalance to the THRESH_max value.

If the power imbalance is greater than the THRESH_max value at 320, then in an aspect, at block 370, the method 300 may include blocking data transmission on a carrier having higher transmit power on the uplink channel. It may be presumed that the uplink channel (e.g., DPCCH) on an RF carrier having a higher transmit power is compensating for channel degradation and may cause a dropped call if uplink transmissions are maintained on the RF carrier. By blocking this RF carrier, data can be rerouted to the remaining RF carrier(s) and thus the uplink transmission can be improved. In an aspect, UE 12 and/or carrier data routing component 40 and/or carrier blocking component 46 (FIG. 1) may block uplink transmissions to the problematic RF carrier.

Optionally, at 372, as an additional remedial measure after block 370, method 300 may further include limiting the maximum throughput for the unblocked RF carrier. The maximum throughput for the unblocked RF carrier may be referred to as a voluntary maximum ETFCI for power imbalance. In an aspect, such throughput limiting may improve error rate on the remaining RF carrier. In an aspect, UE 12 and/or carrier data routing component 40 and/or throughput setting component 45 (FIG. 1) may set a reduced limit for maximum throughput on the remaining carrier. For example, UE 12 and/or carrier data routing component 40 and/or throughput setting component 45 may limit the ETFCI to a set of indexes that limit the throughput to a value within a range that includes, but is not limited to, 30-80% of maximum available throughput. As such, as used in this disclosure, limiting the maximum throughput for the unblocked RF carrier may be referred to as setting a voluntary maximum ETFCI for power imbalance.

In a further optional aspect, after block 370, method 300 at 374 may further include setting an unblocking threshold (PI_BLER) to THRESH_min, which value is for use in method 305 (see FIG. 3B) for determining whether to continue or whether to turn off the blocking, described later below. In an aspect, UE 12 and/or carrier data routing component 40 and/or carrier blocking component 46 (FIG. 1) may set PI_BLER to THRESH_min.

In a second aspect, when the determined power imbalance is not greater than the maximum threshold value, then call drops or throughput degradation may still be experienced at a lesser power imbalance in the presence of certain amounts of BLER. As such, method 300 may additionally involve a test that identifies whether the determined power is greater than a lesser, minimum threshold value in combination with identifying whether a BLER value is greater than a BLER threshold. If this condition exists, then method 300 performs one or more corrective actions to try to avoid a call drop and/or severe throughput degradation.

As such, if the power imbalance is not greater than the THRESH_max value at 320, then in an aspect, at block 330, the method 300 may include determining if the power imbalance for an uplink channel is greater than a minimum threshold (THRESH_min). For example, in an aspect, the value for THRESH_min may be set to a value within a range that includes, but is not limited to, about 5-20 dB, or more preferably to about 15 dB. In an aspect, for example, UE 12 and/or carrier data routing component 40 and/or power imbalance component 42 (FIG. 1) may determine a power imbalance between first RF carrier 22 and second RF carrier 24, and compare the determined power imbalance to the THRESH_min value.

If the determined power imbalance is greater than the THRESH_min value at 330, then in an aspect, at block 340, the method 300 may include identifying whether a BLER is greater than a BLER threshold, such as a threshold associated with a severe BLER or residual BLER. BLER detection component 44 may determine a severe BLER based on exceeding a maximum number of consecutive block errors, or a residual BLER based on a exceeding a maximum number of retransmission failures for UE 12. In an aspect, for example, UE 12 and/or carrier data routing component 40 and/or BLER detection component 44 (FIG. 1) may determine if a severe or residual BLER exists based on counting the number of consecutive block errors or the number of retransmission failures and comparing the respective counted number to the respective threshold. In an aspect, for example, the receive processor 270 and/or controller/processor 290 may detect retransmission failures from decoded control information, and the carrier data routing component 40 and/or BLER detection component 44 may count the number of failed retransmissions. It should be noted that blocks 330 and 340 may be performed in any order.

If method 300 determines that (i) the power imbalance for an uplink channel is not greater than THRESH_max (320), or that (ii) the power imbalance for an uplink channel is greater than THRESH_min (330), but that a severe or residual BLER was not observed (340), then in an aspect, at block 350, the normal TTI processing is continued (e.g., method 300 returns to block 310).

If method 300 determines that the power imbalance for an uplink channel is less than THRESH_max, greater than THRESH_min, and that the BLER is greater than BLER threshold, then in an aspect, at block 360, the method 300 may include blocking data transmission on a carrier having a BLER value greater than a BLER threshold. For example, the transmit processor 280 may execute carrier data routing component 40 and/or carrier blocking component 46 to prohibit a medium access control (MAC) entity from scheduling uplink data transmission on the carrier having a BLER greater than the BLER threshold. In an aspect, the BLER threshold may be set to correspond to a severe BLER condition and/or a residual BLER condition on the uplink channel (e.g., DPCCH). In an aspect, UE 12 and/or carrier data routing component 40 and/or carrier blocking component 46 (FIG. 1) may block uplink transmissions on the problematic RF carrier.

Optionally, at 362, as an additional remedial measure after block 360, method 300 may include limiting the maximum throughput for the unblocked RF carrier(s) to improve error rate on the remaining carrier. In an aspect, UE 12 and/or carrier data routing component 40 and/or throughput setting component 45 (FIG. 1) may set a reduced limit for maximum throughput on the remaining carrier. For example, the ETFCI may be limited to a set of indexes that limit the throughput to a value within a range that includes, but is not limited to, 30-80% of maximum available throughput. By limiting throughput on the unblocked RF carrier(s), a failure of the remaining RF carrier(s) may be is prevented by maintaining a manageable ratio of throughput/uplink signal-to-noise ratio (SNR).

In a further optional aspect, after block 360, method 300 at 364 may further include setting the unblocking threshold, PI_BLER, to the determined power imbalance, for use in method 305 (see FIG. 3B) for determining whether to continue or whether to turn off the blocking, as described later below. In an aspect, UE 12 and/or carrier data routing component 40 and/or carrier blocking component 46 (FIG. 1) may set the value of PI_BLER to the determined power imbalance.

Optionally, after block 360 (or, optionally, blocks 362 and/or 364) or block 370 (or, optionally, blocks 372 and/or 374), method 300 may proceed to carry out method 305 (FIG. 3B) for determining whether to continue or whether to turn off the rerouting (or the blocking) of data for uplink transmission. In an aspect, UE 12 and/or carrier data routing component 40 may proceed to execute method 305.

Figure 3B:
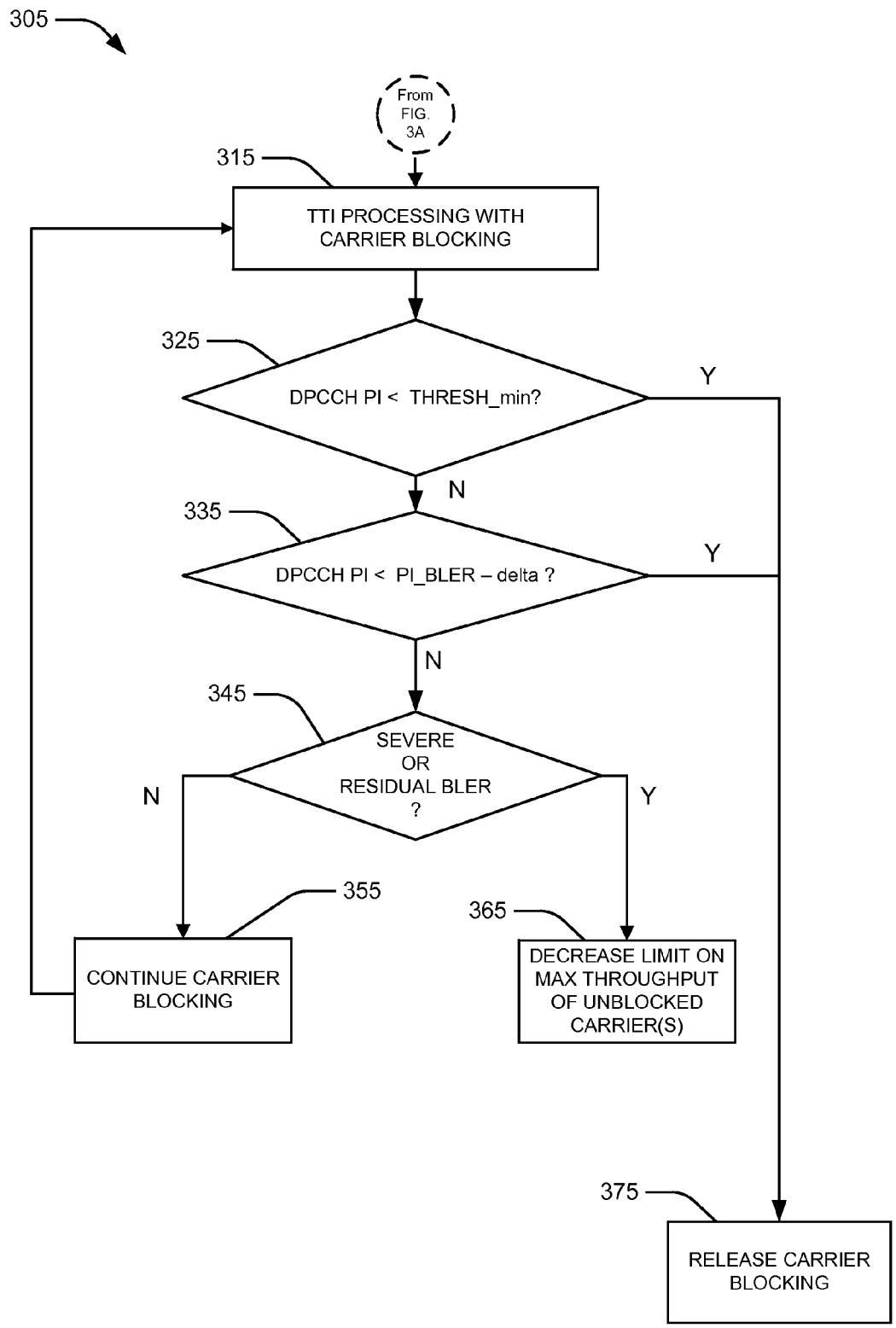
FIG. 3B is a flow diagram illustrating an example method of wireless communications for unblocking or maintaining the blocking of the carrier that was blocked in the method of FIG. 3A.

Referring to FIG. 3B, in an operational aspect, a UE such as UE 12 (FIG. 1) may perform one aspect of method 305 for unblocking uplink transmission on an RF carrier, such as one of the at least two RF carriers 22, 24. In an aspect, method 305 may be implemented by UE 12 executing carrier data routing component 40 and/or one or more of its sub-components as described herein. Further, in an aspect, method 305 may be performed by UE 12 after performing method 300 (FIG. 3A). In a first aspect, method 305 attempts to determine whether the power imbalance alone has been sufficiently reduced to turn off the blocking and start the use of both RF carriers. In a second aspect, when the power imbalance is not reduced enough on its own to turn off RF carrier blocking, method 305 attempts to determine if the combination of the power imbalance and the BLER level is reduced enough to turn off the blocking and permit the use of both RF carriers.

In an aspect, at block 315, the method 305 may include monitoring an uplink channel having a blocked RF carrier every transmission time interval (TTI) with respect to power imbalance on two or more RF carriers. For example, in an aspect, UE 12 and/or carrier data routing component 40 and/or power imbalance component 42 may monitor an uplink channel every transmission time interval (TTI) with respect to power imbalance on the at least two RF carriers 22 and 24.

In an aspect, at block 325, the method 305 may include determining if a power imbalance for an uplink channel has become less than the THRESH_min value. In an aspect, for example, UE 12 and/or carrier data routing component 40 and/or power imbalance component 42 (FIG. 1) may determine a power imbalance between first RF carrier 22 and second RF carrier 24 for an uplink channel, such as DPCCH, and compare the determined power imbalance to the THRESH_min value.

If the power imbalance for the uplink channel is not less than the THRESH_min value, then in an aspect, at block 335, the method 305 may include determining if the power imbalance for the uplink channel is less the unblocking threshold, e.g., PI_BLER, minus a fixed margin value delta. The value for the unblocking threshold, PI_BLER, is set as described above in method 300 (FIG. 3A). The value for delta may be set to a value within a range that includes, but is not limited to, about 3-9 dB, for example, to provide hysteresis for the blocking and unblocking of the RF carrier. In an aspect, for example, UE 12 and/or carrier data routing component 40 and/or power imbalance component 42 (FIG. 1) may determine the power imbalance between first RF carrier 22 and second RF carrier 24, and perform the above comparison.

If the power imbalance for the uplink channel is not less the unblocking threshold, PI_BLER, minus a margin value delta, then in an aspect, at block 345, the method 305 may include identifying whether BLER is above a BLER threshold, where the BLER threshold may correspond to a severe BLER or residual BLER. In an aspect, for example, UE 12 and/or carrier data routing component 40 and/or BLER detection component 44 (FIG. 1) may determine if a severe or residual BLER has been observed.

In an aspect, at block 355, method 305 may include continuing the blocking of uplink transmissions on the blocked RF carrier if the power imbalance remains greater than the THRESH_min (block 325), and the power imbalance remains greater than the unblocking threshold minus delta (block 335), and no BLER greater than a BLER threshold is observed (block 345). In an aspect, for example, UE 12 and/or carrier data routing component 40 and/or carrier blocking component 46 (FIG. 1) may continue the blocking of the RF carrier. Following block 355, the method 305 returns to block 315 for repeating.

Alternatively, at block 365, the maximum throughput for the unblocked RF carrier may be further limited to improve error rate on the remaining carrier in response to the BLER being greater than a BLER threshold (e.g., severe or residual BLER) (block 345) in combination with the power imbalance remaining greater than the THRESH_min (block 325) and remaining greater than the unblocking threshold minus delta (block 335). In an aspect, UE 12 and/or carrier data routing component 40 and/or throughput setting component 45 (FIG. 1) may set a reduced limit for maximum throughput on the remaining carrier. For example, in this case, UE 12 and/or carrier data routing component 40 and/or throughput setting component 45 may further decrease the ETFCI limit to a set of indexes that cap the throughput to a lesser value.

Additionally, at block 375, method 305 may include releasing the carrier blocking in response to detecting that the power imbalance has fallen below the THRESH_min value (block 325) or below the unblocking threshold PI_BLER minus delta (block 335). In an aspect, UE 12 and/or carrier data routing component 40 and/or carrier blocking component 46 (FIG. 1) may release the carrier blocking.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112 (f), unless the element is expressly recited using the phrase "means for" or, in the case of a method claim, the element is recited using the phrase "step for."

What is claimed is:

1. A method of a user equipment (UE) controlling dual carrier uplink transmission for wireless communications, comprising:
   determining, by the UE, a power imbalance between a first radio frequency (RF) carrier and a second RF carrier of a dedicated physical control channel for uplink transmission;
   determining, by the UE, whether the power imbalance is greater than a power imbalance threshold; and
   blocking, by the UE, data transmission on one of the first RF carrier or the second RF carrier when the power imbalance is greater than the power imbalance threshold.

2. The method of claim 1, wherein blocking data transmission comprises:
   blocking data transmission on an RF carrier having higher transmit power on a condition that the power imbalance is within a threshold range.

3. The method of claim 1, further comprising:
   wherein determining whether the power imbalance is greater than the power imbalance threshold includes determining whether the power imbalance is greater than a maximum power imbalance threshold;
   determining, by the UE, when the power imbalance is not greater than the maximum power imbalance threshold, whether:
      the power imbalance is greater than a minimum power imbalance threshold; and
      an uplink block error rate (BLER) is greater than a BLER threshold; and
   blocking, by the UE, data transmission on one of the first RF carrier or the second RF carrier when the power imbalance is not greater than the maximum power imbalance threshold and is greater than the minimum power imbalance threshold, and when the BLER is greater than the BLER threshold.

4. The method of claim 3, wherein blocking data transmission comprises:
   blocking data transmission on an RF carrier having severe BLER or residual BLER on a condition that the power imbalance exceeds the minimum power imbalance threshold, where severe BLER is defined by exceeding a maximum number of consecutive block errors and residual BLER is defined by exceeding a maximum number of retransmission attempts without success.

5. The method of claim 3, further comprising:
   unblocking, by the UE, data transmission on a blocked RF carrier on a condition that the power imbalance becomes less than the minimum power imbalance threshold.

6. The method of claim 1, further comprising limiting, by the UE, maximum throughput on an unblocked RF carrier to a reduced limit.

7. A method of a user equipment controlling dual carrier uplink transmission for wireless communications, comprising:
   blocking, by the UE, data transmission on one of a first RF carrier or a second RF carrier in response to a determined power imbalance between the first radio frequency (RF) carrier and the second RF carrier of a dedicated physical control channel for uplink transmission;
   setting, by the UE, an unblocking value to a minimum power imbalance threshold on a condition that the power imbalance is greater than a maximum power imbalance threshold;
   setting, by the UE, the unblocking value to the determined power imbalance on a condition that the power imbalance is not greater than a maximum power imbalance threshold but is greater than a minimum power imbalance threshold and that a detected uplink block error rate (BLER) is greater than a BLER threshold; and
   unblocking, by the UE, a blocked data transmission on the one of the first RF carrier or the second RF carrier on a first condition that the power imbalance is less than the minimum power imbalance threshold, or on a second condition that the power imbalance is less than the unblocking value minus a fixed margin value.

8. The method of claim 7, further comprising:
   reducing, by the UE, a reduced limit for maximum throughput on an unblocked carrier on a condition that the BLER remains greater than the BLER threshold.

9. A user equipment (UE) for controlling dual carrier uplink transmission for wireless communication, comprising:
   a transceiver including a transmitter configuration of current transmit power settings for each of a plurality of RF carriers; and
   a modem processor of the UE, coupled to the transceiver, including:
      a power imbalance component configured to determine a power imbalance between a first radio frequency (RF) carrier and a second RF carrier of a dedicated physical control channel for uplink transmission based on the transmitter configuration and to determine whether the power imbalance is greater than a power imbalance threshold; and
      a carrier blocking component configured to block data transmission on one of the first RF carrier or the second RF carrier when the power imbalance is greater than the power imbalance threshold.

10. The UE of claim 9, wherein the carrier blocking component is further configured to block data transmission on an RF carrier having higher transmit power on a condition that the power imbalance is within a threshold range.

11. The UE of claim 9, wherein the modem processor further includes:
    a block error rate (BLER) detection component configured to detect BLER;
    wherein the power imbalance component is further configured to:
       determine whether the power imbalance is greater than the power imbalance threshold includes determining whether the power imbalance is greater than a maximum power imbalance threshold;
       determine, when the power imbalance is not greater than the maximum power imbalance threshold, whether:
          the power imbalance is greater than a minimum power imbalance threshold; and
          an uplink block error rate (BLER) is greater than a BLER threshold; and
    wherein the carrier blocking component is further configured to block data transmission on one of the first RF carrier or the second RF carrier when the power imbalance is not greater than the maximum power imbalance threshold and is greater than the minimum power imbalance threshold, and when the BLER is greater than the BLER threshold.

12. The UE of claim 11, wherein the carrier blocking component is further configured to block data transmission on an RF carrier having severe BLER or residual BLER on a condition that the power imbalance exceeds the minimum power imbalance threshold, where severe BLER is defined by exceeding a maximum number of consecutive block errors and residual BLER is defined by exceeding a maximum number of retransmission attempts without success.

13. The UE of claim 9, wherein the modem processor further includes a throughput setting component configured to limit maximum throughput on an unblocked RF carrier to a reduced limit.

14. The UE of claim 11, wherein the carrier blocking component is further configured to unblock data transmission on a blocked RF carrier on a condition that the power imbalance becomes less than the minimum power imbalance threshold.

15. A user equipment (UE) for controlling dual carrier uplink transmission for wireless communication, comprising:
  a transceiver including a transmitter configuration of current transmit power settings for each of a plurality of RF carriers; and
  a modem processor of the UE, coupled to the transceiver, including a carrier blocking component configured to:
    block data transmission on one of a first RF carrier or a second RF carrier in response to a determined power imbalance between the first radio frequency (RF) carrier and the second RF carrier of a dedicated physical control channel for uplink transmission based on the transmitter configuration;
    set an unblocking value to a minimum power imbalance threshold on a condition that the power imbalance is greater than a maximum power imbalance threshold;
    set the unblocking value to the determined power imbalance on a condition that the power imbalance is not greater than a maximum power imbalance threshold but is greater than a minimum power imbalance threshold and that a detected uplink block error rate (BLER) is greater than a BLER threshold; and
    unblock data transmission on the one of the first RF carrier or the second RF carrier on a first condition that the power imbalance is less than the minimum power imbalance threshold, or on a second condition that the power imbalance is less than the unblocking value minus a fixed margin value.

16. The UE of claim 15, further comprising a throughput setting component configured to reduce a reduced limit for maximum throughput on an unblocked RF carrier on a condition that the BLER remains greater than the BLER threshold.

17. A user equipment (UE) for controlling dual carrier uplink transmission for wireless communication, comprising:
  means for determining a power imbalance between a first radio frequency (RF) carrier and a second RF carrier of a dedicated physical control channel for uplink transmission;
  means for determining whether the power imbalance is greater than a power imbalance threshold; and
  means for blocking data transmission, from the UE, on one of the first RF carrier or the second RF carrier when the power imbalance is greater than the power imbalance threshold.

18. The UE of claim 17, wherein means for blocking data transmission blocks data transmission on an RF carrier having higher transmit power on a condition that the power imbalance is within a threshold range.

19. The UE of claim 17, further comprising:
  wherein means for determining whether the power imbalance is greater than the power imbalance threshold includes determining whether the power imbalance is greater than a maximum power imbalance threshold;
  means for determining, when the power imbalance is not greater than the maximum power imbalance threshold, whether:
    the power imbalance is greater than a minimum power imbalance threshold; and
    an uplink block error rate (BLER) is greater than a BLER threshold; and
  wherein the means for blocking data transmission on one of the first RF carrier or the second RF carrier blocks data transmission when the power imbalance is not greater than the maximum power imbalance threshold and is greater than the minimum power imbalance threshold, and when the BLER is greater than the BLER threshold.

20. The UE of claim 19, wherein means for blocking data transmission blocks data transmission on an RF carrier having severe BLER or residual BLER on a condition that the power imbalance exceeds the minimum power imbalance threshold, where severe BLER is defined by exceeding a maximum number of consecutive block errors and residual BLER is defined by exceeding a maximum number of retransmission attempts without success.

21. The UE of claim 19, further comprising:
  means for unblocking data transmission on a blocked RF carrier on a condition that the power imbalance becomes less than the minimum power imbalance threshold.

22. The UE of claim 17, further comprising means for limiting maximum throughput on an unblocked RF carrier to a reduced limit.

23. The UE of claim 17, further comprising:
  means for setting an unblocking value to a minimum power imbalance threshold on a condition that the power imbalance is greater than a maximum power imbalance threshold;
  means for setting the unblocking value to the power imbalance on a condition that the power imbalance is not greater than a maximum power imbalance threshold but is greater than a minimum power imbalance threshold and that an uplink BLER is greater than a BLER threshold; and
  means for unblocking a blocked data transmission on the one of the first RF carrier or the second RF carrier on a first condition that the power imbalance is less than the minimum power imbalance threshold, or on a second condition that the power imbalance is less than the unblocking value minus a fixed margin value.

* * * * *